United States Patent [19]
Bleijerveld

[11] Patent Number: 5,731,780
[45] Date of Patent: Mar. 24, 1998

[54] RADAR SYSTEM

[75] Inventor: Hendrik Cornelis Bleijerveld, Hengelo, Netherlands

[73] Assignee: Hollandse Signaalapparaten B.V., Hengelo, Netherlands

[21] Appl. No.: 801,390

[22] Filed: Dec. 2, 1991

[30] Foreign Application Priority Data

Dec. 11, 1990 [NL] Netherlands .................. 9002717

[51] Int. Cl.$^6$ .................... G01S 13/48; G01S 13/72
[52] U.S. Cl. .................... 342/75; 342/146; 342/147; 342/158
[58] Field of Search .................... 342/13, 123, 146, 342/147, 158, 180, 74, 75, 359

[56] References Cited

U.S. PATENT DOCUMENTS

| | | |
|---|---|---|
| 3,971,020 | 7/1976 | Howard . |
| 4,158,840 | 6/1979 | Schwab . |
| 4,531,125 | 7/1985 | Beyer et al. .................... 343/758 X |
| 4,532,519 | 7/1985 | Rudish et al. .................... 343/372 |
| 4,538,150 | 8/1985 | Bone, Jr. .................... 342/174 |
| 4,562,439 | 12/1985 | Peralta et al. .................... 342/81 |
| 4,584,584 | 4/1986 | Kliger .................... 342/451 |
| 4,649,389 | 3/1987 | Taylor, Jr. et al. .................... 342/123 |
| 4,649,390 | 3/1987 | Andrews et al. .................... 342/140 |
| 4,670,758 | 6/1987 | Campbell .................... 342/458 |
| 4,743,907 | 5/1988 | Gellekink .................... 342/59 |
| 4,831,384 | 5/1989 | Sefton, Jr. .................... 342/188 |
| 4,951,059 | 8/1990 | Taylor, Jr. .................... 342/155 |
| 5,061,935 | 10/1991 | Sekine et al. .................... 342/180 |
| 5,066,956 | 11/1991 | Martin .................... 342/154 |
| 5,077,560 | 12/1991 | Horton et al. .................... 342/359 |
| 5,153,485 | 10/1992 | Yamada et al. .................... 318/35 |
| 5,173,708 | 12/1992 | Suzuki et al. .................... 342/359 |
| 5,181,040 | 1/1993 | Inoue et al. .................... 342/149 |

FOREIGN PATENT DOCUMENTS 8500896 of 1985 WIPO .

OTHER PUBLICATIONS

W.J. Evanzia, Faster, Lighter 3-d Radars in Sight for Tactical Warfare, vol. 39, No. 3, Jun. 27, 1966, pp. 80-88, NY, NY, Journal of Electronics.

M.I. Skolnik, Radar Handbook, 1970, pp. 223-224, McGraw-Hill, NY, NY.

*Primary Examiner*—John B. Sotomayor
*Attorney, Agent, or Firm*—Oblon, Spivak, McClelland, Maier & Neustadt, P.C.

[57] ABSTRACT

Radar system for the generation of two-dimensional or three-dimensional position indications of targets. Three-dimensional position indications are obtained by periodically canting the antenna about a canting axis, such that the antenna beam plane makes an angle with a normal on the earth's surface and by combining azimuth data and range data obtained at different canting angles. For a radar system provided with dual-axis stabilization means, these means may also provide for the canting of the antenna means.

7 Claims, 1 Drawing Sheet

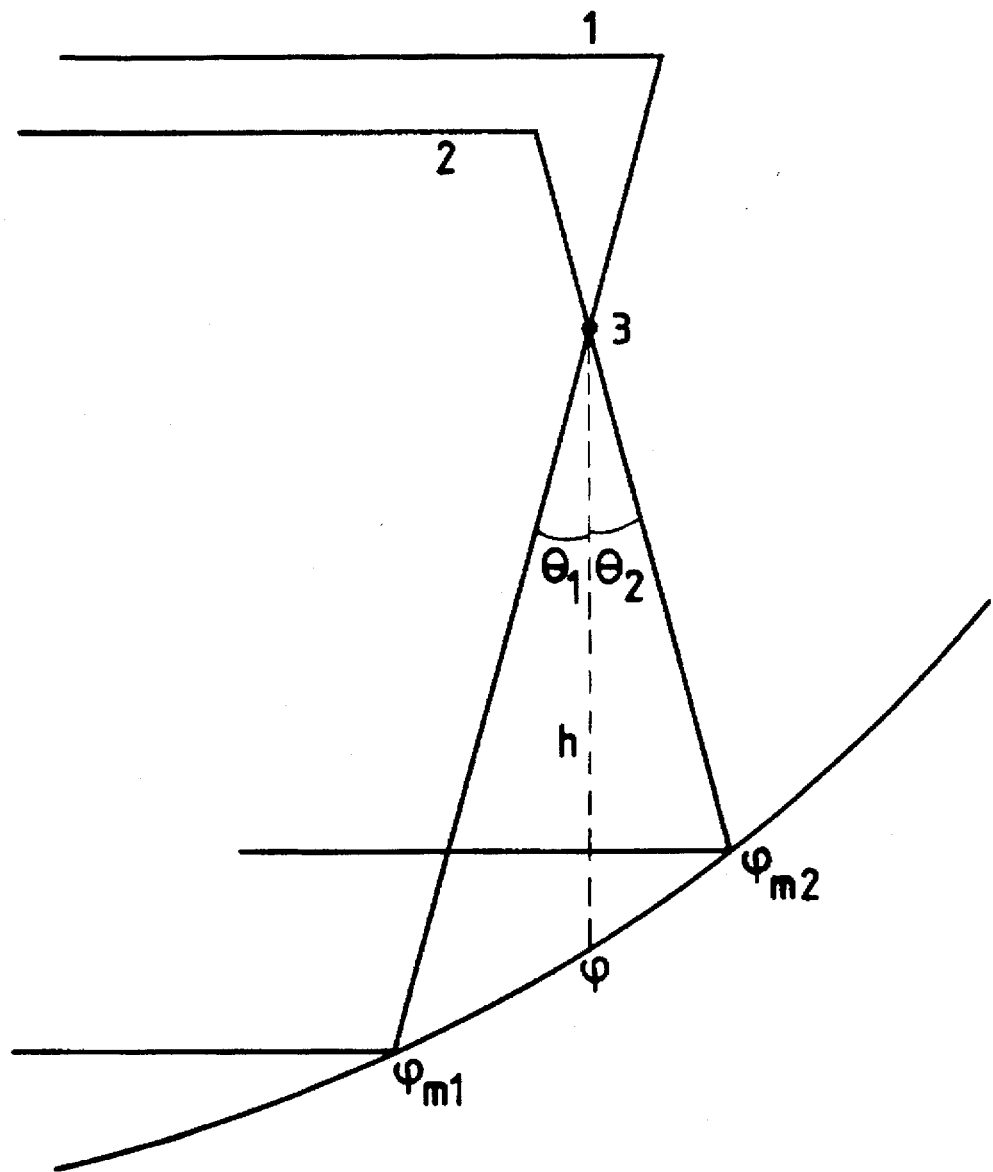

5,731,780

RADAR SYSTEM

BACKGROUND OF THE INVENTION

The invention relates to a radar system for the generation, as required, of two-dimensional or three-dimensional position indications of targets present within the search volume of the radar system, at least provided with:

i) antenna means for the generation of a fan beam, the fan beam defining an antenna beam plane;
ii) means for rotating, in azimuth, the antenna means at an antenna rotation time T;
iii) radar means, cooperating with the antenna means, for the generation of azimuth data and range data for the targets.

Three-dimensional position indication can be of great importance. If, for example, a radar system is positioned in the vicinity of a military installation, or onboard a naval vessel, then from the height of an incoming target, a tentative conclusion can often be drawn as to the nature of this target. If the target is identified as potentially hostile, a fire control radar can, if a three-dimensional position indication is available, at once be aimed at this target. In case only a two-dimensional position indication is available, an addition elevation search scan of the fire control radar is required.

A method for generating three-dimensional position indications is described in EP-A 0.151.640. The radar system described there is provided with antenna means for the generation, as required, of a fan beam or a pencil beam. If the antenna means are rotated during the generation of a fan beam, the search volume of the radar system can be scanned efficiently. The elevation angle of an observed target can be determined while the antenna means generate a pencil beam, whereby the azimuth is fixed in the direction of the target and a search scan in elevation is performed.

This method has the drawback that a two-dimensional phased array antenna has to be used for the generation, as required, of a fan beam or a pencil beam, which makes the radar system unduly expensive.

SUMMARY OF THE INVENTION

The invention is aimed at eliminating this drawback and is characterised in that the antenna means are provided with means for the canting, about a canting axis, of the antenna, such that the antenna beam plane makes an angle of cant $\theta$ with a normal on the earth's surface, and that the radar system is provided with means for the combining of azimuth data and range data of targets, measured at different angles of cant $\theta_i$ (i=1 ..., n), to two-dimensional or three-dimensional position indications of those targets.

The generation, as required, of two-dimensional or three-dimensional position indications using canted antennas is as such well-known, and is for instance described in the "Radar Handbook" by M. I. Skolnik, under the name: V-beam radar. Such a radar system is provided with two antennas, either positioned side by side, or mounted one above the other, which rotate simultaneously, each generating a fan beam. Each fan beam defines an antenna beam plane, and these planes together form an angle, whereby the line of intersection of the antenna beam planes is virtually tangential to the earth's surface. Both antennas are provided with radar means and will detect targets close to the earth's surface at substantially the same azimuth. For a target which is at a height h, a difference in azimuth will be observed by the two antennas plus the coupled radar means. If this difference in azimuth is $\Delta\phi$, then h is substantially proportional to $\Delta\phi$. Combination means, placed at the output of the radar means can thus determine the height of each target within the search volume of the radar system.

The drawback of this method, especially in maritime applications, is the substantial top weight, caused by the duplicated antenna. This renders the application almost unrealisable, especially onboard smaller vessels. An additional drawback is that the radar means, too, must be duplicated.

BRIEF DESCRIPTION OF THE DRAWING

The invention will now be further explained with reference to the FIGURE which is a schematical representation of the method by which the height of a target is determined.

DETAILED DESCRIPTION OF THE INVENTION

The explanation is based on a radar system provided with a rotating antenna and radar means for accurately determining the range and azimuth of targets within the search volume of the radar system. The antenna generates a fan beam with a relatively small azimuth opening angle and a relatively wide elevation opening angle. The antenna beam plane thus defined is virtually perpendicular to the earth's surface, which for the moment is assumed to be flat. The line of intersection of the antenna beam plane and the earth's surface will be further referred to as the canting axis. Means are now added enabling the antenna to be canted such that the antenna beam plane is no longer perpendicular to the earth's surface, but rotates about the canting axis. When the azimuths of targets, obtained with the antenna in non-canted and canted position are compared, it appears that targets on the earth's surface are still observed at the same azimuth. A target at a certain height is measured at an azimuth that depends on the angle of cant and the height of the target.

This is explained with reference to the FIGURE, in which a first antenna beam plane 1 with an angle of cant $\theta_1$ and a second antenna beam plane 2 with an angle of cant $\theta_2$ contain a target 3, for instance during two consecutive rotations, when the antenna means are successively canted at the mentioned angles. With an angle of cant $\theta_1$ the target is measured in azimuth direction $\phi_{m1}$, with an angle of cant $\theta_2$ the target is measured in azimuth direction $\phi_{m2}$. The true azimuth direction is $\phi$.

If we assume the height h of the target to be far less than the distance R between the target and the radar system, the following applies to the FIGURE, at least virtually so:

$$tg\,\theta_1 = \frac{R}{h}(\phi_{m1} - \phi) \quad (1)$$

$$tg\,\theta_2 = \frac{R}{h}(\phi_{m2} - \phi) \quad (2)$$

so that $$h = \frac{R(\phi_{m2} - \phi_{m1})}{tg\,\theta_2 - tg\,\theta_1} \quad (3)$$

In the actual situation, with a curved earth, there are advantages in selecting the canting axis such that it is perpendicular to a normal on the earth's surface at the location of the antenna means. For a radar system, situated near the earth's surface this means that objects near the earth's surface are continuously observed at the same azimuth angle, irrespective of the angle of cant. The radar system will then provide an undistorted picture of the earth's surface. Only objects which are at a certain height will experience an apparent displacement as a result of the canting of the antenna means. For these objects only, combination means are required, which combine the echoes measured at different angles of cant $\theta_i$ (i=1, ... n).

For a radar system, mounted in an aircraft or any other airborne platform, there are advantages, too, in selecting the canting axis as described above, because this will instantly reveal if an object is above or below the airborne platform. At a given angle of cant an object above the airborne platform will be observed too early, relatively speaking and with reference to the measured azimuth, whereas an object below it will be observed too late.

An advantageous embodiment of the invention is achieved in applications whereby the antenna means are provided with dual axis stabilization means, as encountered onboard ships and in aircraft. Usually, these stabilisation means can easily be equipped with a control input enabling a required angle of cant to be obtained.

Sometimes it is acceptable for a radar system to have a blind angle, an azimuth sector in which the radar system supplies unreliable information or none at all. This occurs, for example, onboard a ship whose superstructure forms an obstacle for the emitted and received radiation. If a blind angle is acceptable, a particularly advantageous embodiment of the invention can be chosen, whereby the angle of cant periodically varies virtually stepwise, and whereby the virtually stepwise variation of the angle of cant always takes place when the blind angle is traversed.

If, for instance, we cause the angle of cant $\theta$ to change per antenna revolution in the order $\theta, -\theta, \theta, -\theta, \ldots$, this means that after a single revolution, the height h of a previously observed object can be determined according to formula (3):

$$h = \frac{(R(\phi_{m2} - \phi_{m1})}{2\, tg\, \theta} \tag{4}$$

A disturbing factor may be formed by a tangential speed of the object. If that is significant, two revolutions (3 measurements) are needed: If $\epsilon$ is the extra angular displacement occurring as a result of the radial speed, three consecutive measurements will produce the values $\phi_{m1}, \phi_{m2}^{+\epsilon}, \phi_{m3}^{+2\Theta}$, whereby $\phi_{m1}, \phi_{m2}, \phi_{m3}$ are the azimuths which would have been measured without radial speed. The following applies:

$$\epsilon = \frac{\phi_{m3} - \phi_{m1}}{2} \tag{5}$$

$$h = \frac{R(\phi_{m2} - \epsilon - \phi_{m1})}{2\, tg\, \theta} = \frac{R(-\phi_{m3} + 2\phi_{m2} - \phi_{m1})}{4\, tg\, \theta} \tag{6}$$

In an alternative embodiment the radar system is normally used at an angle of cant $\theta=0$. Only when the height of an object needs to be measured, one antenna revolution, or part of it (which will often suffice), will be completed at an angle of cant $\theta \neq 0$.

In this form, the invention is particularly suitable for addition to existing radar systems. Such radar systems are mostly provided with a track computer which, using the data produced during each antenna revolution, builds up tracks of potentially interesting targets. In due course, the position and speed of the targets being thus tracked become accurately known. The unknown height of a target can be ascertained by determining the target position once or several times by a canted antenna. Provided the combining, in this way, of target positions at different angles of cant can be kept down to a minimum, the available track computer will usually be able to perform the additional function of combination means.

If the presence of a blind angle is less acceptable for a radar system, the angle of cant can be varied continuously. An obvious choice is varying the angle of cant harmonically, whereby the angle of cant completes a period during the time the antenna makes n revolutions:

$$\theta(t) = \theta_{max} \cdot \sin\left(\theta_0 + \frac{2\pi t}{nT}\right) \tag{7}$$

$\theta_{max}$ being the maximum permissible angle of cant, $\theta_0$ an arbitrarily selectable initial phase of the angle of cant, and T the antenna rotation time.

With n=1, a target is always measured at the same angle of cant, and therefore its height cannot be determined.

With n=2 in effect produces a blind angle. If, for instance, we assume that always the largest angle of cant occurs when the radar looks forward, then the angle of cant will always be zero when the radar looks backward.

With n=large, the consecutive measurements $\theta_{mi}$ will vary only a little, which may adversely affect the height determination.

With n not a whole number, the combining of successive height measurements becomes needlessly complex. An advantageous embodiment is therefore obtained with n=3.

Suppose the following applies for the successive measurements:

| | |
|---|---|
| $\phi_{m1}, \phi_{m2}, \phi_{m3}, \ldots$ | the measured azimuths; |
| $\theta_1, \theta_2, \theta_3, \ldots$ | the instantaneous angles of cant; |
| $R_1, R_2, R_3, \ldots$ | the measured target distances; |
| $h_1, h_2, h_3, \ldots$ | the target height estimates; |
| $\phi_1, \phi_2, \phi_3, \ldots$ | the target azimuth estimates; |

From two successive measurements the target height can then always be determined, in a manner analogous to (3):

$$h_i = \frac{R_i(\phi_{mi} - \phi_{mi-1})}{tg\, \theta_i - tg\, \theta_{i-1}} \quad i = 2, 3, 4, \ldots \tag{8}$$

Here, too, a tangential speed of the target causes an error in the height determination. Through including more measurements in the estimation and assuming h to be constant, this error can be eliminated:

$$h = \frac{R_{i+1}(\phi_{mi+1} - \phi_{mi} + \epsilon)}{tg\, \theta_{i+1} - tg\, \theta_i} \tag{9}$$

$$h = \frac{R_i(\phi_{mi} - \phi_{mi-1} + \epsilon)}{tg\, \theta_i - tg\, \theta_{i-1}} \tag{10}$$

Equations (9) and (10) contain as unknowns the heigh and the angular error $\epsilon$ caused by a tangential speed of the target. Through eliminating $\epsilon$, the height is obtained.

Through including more and more measurements in the estimation, a proportionally better estimate of the height can be attained. However, this is detrimental to the reaction time of the radar system, while the estimation becomes susceptible to any manoeuvres the target may make.

An advantageous embodiment is obtained through always combining four, preferably consecutive, measurements into an estimate.

Once a target has been made into a track by the track computer associated with the radar means, R and $\phi$ are always known. For each new measurement, with $\theta$ given, a $\phi_m$ is measured, so that the height can be determined:

$$h = \frac{R}{tg\, \theta}(\phi_m - \phi) \tag{11}$$

I claim:

1. In a radar system for a generation, as required, of two-dimensional or three-dimensional position indications of targets present within a search volume of the radar system, the radar system comprising: antenna means for the generation of a fan beam, the fan beam defining an antenna beam plane; means for rotating, in azimuth, the antenna means at an antenna rotation time T; and radar means, cooperating with the antenna means, for the generation of azimuth data and range data for the targets, the improvement comprising:

canting means for canting, about a canting axis, the antenna means, such that the antenna beam plane makes an angle of cant θ with a normal on the earth's surface, wherein the antenna means are provided with dual-axis stabilization means, and the dual-axis stabilization means also provide for the canting of the antenna means, and wherein the canting axis is substantially perpendicular to normal, and lies in the antenna beam plane; and means for combining azimuth data and range data of targets, measured at different angles of cant $\theta_i$ (i=1, . . . , n), to two-dimensional or three-dimensional position indications of the targets.

2. In the radar system according to claim 1, wherein the angle of cant θ varies substantially stepwise in time.

3. In the radar system according to claim 2, wherein the angle of cant θ varies substantially periodically in time.

4. In the radar system according to claim 3, wherein the period time of the angle of cant θ is substantially nT (n =2, 3, 4, . . . ).

5. In the radar system according to claim 1, wherein the angle of cant varies substantially harmonically in time, and the period time of the angle of cant θ is substantially nT (n=3, 4, 5, . . . ).

6. In the radar system according to either of claims 4 or 5, wherein for target azimuths $\phi_{mi}, \phi_{mi+1}, \ldots, \phi_k$ and distances $R_1, R_{i+1}, \ldots, R_k$ have been measured (i, k ∈ N), and the azimuths $\phi_{mi}, \phi_{mi+1}, \ldots, \phi_k$ and the distances $R_1, R_{i+1}, \ldots, R_k$ have been measured at the angles of cant $\theta_i, \theta_{i+1}, \ldots, \theta_k$, and an estimate of a height $h_k$ of the targets is obtained from the angles of cant $\theta_j, \ldots, \theta_k$, and an estimate of the height $h_k$ is obtained from the angles of cant $\theta_j, \ldots, \theta_k$, the measurements $\phi_{mj}, \ldots, \phi_{mk}$ and $R_j, \ldots, R_k$ where j ∈ N; i≦j≦k.

7. In the radar system according to either of claims 4 or 5, the improvement further comprising a track computer which continuously generates an estimate of a distance R to the targets and the azimuth $\phi$m and an estimate of a height of the targets is obtained from R, $\phi$, the instantaneous angle of cant θ and the measured azimuth $\phi_m$.

* * * * *